United States Patent
Wood et al.

(10) Patent No.: US 8,296,414 B1
(45) Date of Patent: Oct. 23, 2012

(54) TECHNIQUES FOR AUTOMATED APPLICATION DISCOVERY

(75) Inventors: Douglas A. Wood, Westford, MA (US); Uday K. Gupta, Westford, MA (US); Andreas L. Bauer, Boxborough, MA (US); Stephen J. Todd, Shrewsbury, MA (US); Mark A. Parenti, Milford, NH (US)

(73) Assignee: EMC Corporation, Hopkinton, MA (US)

( * ) Notice: Subject to any disclaimer, the term of this patent is extended or adjusted under 35 U.S.C. 154(b) by 751 days.

(21) Appl. No.: 11/906,160

(22) Filed: Sep. 28, 2007

(51) Int. Cl.
G06F 15/173 (2006.01)

(52) U.S. Cl. ........ 709/224; 709/223; 709/225; 709/226; 709/236

(58) Field of Classification Search ............. 709/203, 709/206, 223, 217, 220, 224, 105, 222; 707/4, 707/100, 203, 204; 711/170, 171, 154; 718/1; 726/2; 715/833; 719/320
See application file for complete search history.

(56) References Cited

U.S. PATENT DOCUMENTS

| | | | |
|---|---|---|---|
| 6,363,477 B1 * | 3/2002 | Fletcher et al. | 713/151 |
| 6,961,766 B2 * | 11/2005 | Janosik et al. | 709/224 |
| 7,275,098 B1 * | 9/2007 | Becher et al. | 709/223 |
| 7,484,038 B1 * | 1/2009 | Aiello et al. | 711/114 |
| 7,523,231 B1 * | 4/2009 | Gupta et al. | 710/36 |
| 7,779,368 B2 * | 8/2010 | Wichelman et al. | 715/833 |
| 2002/0083118 A1 * | 6/2002 | Sim | 709/105 |
| 2002/0133541 A1 * | 9/2002 | Sturtevant et al. | 709/203 |
| 2003/0187860 A1 * | 10/2003 | Holland | 707/100 |
| 2003/0195943 A1 * | 10/2003 | Bradshaw et al. | 709/217 |
| 2004/0030768 A1 * | 2/2004 | Krishnamoorthy et al. | 709/223 |
| 2005/0044330 A1 * | 2/2005 | Elazar et al. | 711/154 |
| 2005/0198238 A1 * | 9/2005 | Sim et al. | 709/222 |
| 2005/0278422 A1 * | 12/2005 | Prust | 709/203 |
| 2006/0015544 A1 * | 1/2006 | Kodama | 707/204 |
| 2006/0095705 A1 * | 5/2006 | Wichelman et al. | 711/171 |
| 2006/0106789 A1 * | 5/2006 | Fernandez | 707/4 |
| 2006/0277383 A1 * | 12/2006 | Hayden et al. | 711/170 |
| 2007/0192417 A1 * | 8/2007 | Kornfeld | 709/206 |
| 2007/0198690 A1 * | 8/2007 | Kodama | 709/223 |
| 2008/0022277 A1 * | 1/2008 | Kano | 718/1 |
| 2008/0208926 A1 * | 8/2008 | Smoot et al. | 707/203 |
| 2008/0209033 A1 * | 8/2008 | Ginter et al. | 709/224 |
| 2009/0083399 A1 * | 3/2009 | Ocko et al. | 709/220 |
| 2009/0300718 A1 * | 12/2009 | Rensin et al. | 726/2 |

OTHER PUBLICATIONS

U.S. Appl. No. 10/792,410, filed Mar. 4, 2004.
U.S. Appl. No. 10/792,649, filed Mar. 4, 2004.
U.S. Appl. No. 11/824,578, filed Jun. 29, 2007, Gupta et al.
U.S. Appl. No. 11/864,040 filed Sep. 28, 2007, "Techniques or Supporting Application Operation".

* cited by examiner

Primary Examiner — John Macilwinen
Assistant Examiner — Michael Martinez
(74) Attorney, Agent, or Firm — Muirhead and Saturnelli, LLC

(57) ABSTRACT

Described are techniques for performing automated discovery processing in a network. A data storage system monitors transmissions sent over the network. The data storage system extracts one or more data elements from one or more messages included in the transmissions and determines at least one application executing on a component in the network in accordance with the one or more data elements.

13 Claims, 14 Drawing Sheets

Version 272
Source Address 274
Destination Address 276

FIG. 9

| Source Port 282 | Destination Port 284 | Data offset 286 | ..  .. |

280

TECHNIQUES FOR AUTOMATED APPLICATION DISCOVERY

BACKGROUND

1. Technical Field

This application generally relates to data storage, and more particularly to techniques used for performing processing to discover information about the applications and environments.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, a customer may perform data storage configuration tasks when a new storage device is introduced for use into a network. Such tasks may include, for example, identifying the particular application(s), such as an email application, which will use the new storage device, and configuring storage for use with the particular application(s). In connection with the configuration processing, tasks may include allocating storage, specifying the logical and/or physical devices used for the storage allocation, specifying whether the data should be replicated, the particular RAID (Redundant Array of Independent or Inexpensive Disks) level, and the like. With such options in connection with performing the configuration, a customer may not have the appropriate level of sophistication and knowledge needed. Configuration information for the one or more applications may be entered manually and the user must have an understanding of various aspects of the environment in which the applications will be executing. Selecting the appropriate configuration parameters for each application based on the storage needs of the particular application can be a complex and tedious process requiring knowledge of best practices for the application environment.

Thus, it may be desirable to utilize a flexible technique which assists customers in connection with performing automated discovery of the applications and application environments. The technique may be used to obtain data regarding the applications and application environments. The data may then be used in connection with determining the appropriate data storage configuration for each application.

SUMMARY OF THE INVENTION

In accordance with one aspect of the invention is a computer-implemented method for performing automated discovery processing in a network comprising: monitoring, by a data storage system, transmissions sent over the network; extracting, by the data storage system, one or more data elements from one or more messages included in the transmissions; and determining, by the data storage system, at least one application executing on a component in the network in accordance with said one or more data elements. The steps of monitoring, extracting and determining may be performed as part of initializing said data storage system. The data storage system may obtain additional data regarding said at least one application by communicating with the component. The data storage system may obtain a portion of the additional data using a discovery agent installed on the component. The data storage system may obtain another portion of the additional data using software on the component without using said discovery agent. The data storage system may be connected to a computer network to perform said automated discovery processing and the data storage system processes I/O requests in accordance with at least a first protocol at an application layer and performs said extracting step in accordance with at least one other protocol. The data storage system may perform said extracting and extract one or more data elements in accordance with at least a first protocol at an application layer and at least one other protocol at a different layer, said application layer and said different layer being two layers used in connection with said transmissions. The data storage system may process I/O requests in accordance with at least one of iSCSI or SCSI protocols, and performs said extracting in accordance with at least one other protocol associated with an internet layer protocol or a transport layer protocol.

In accordance with another aspect of the invention is a computer-implemented method for obtaining a software agent for use on a component in a network comprising: issuing a request, from the component to a data storage system, to install the software agent; and downloading, in response to the request, the software agent to the component, wherein the software agent performs data collection for use by the data storage system. The component may be a server system. The server system may store data on the data storage system in connection with an application executing on the server system. The method may also include logging into the component prior to issuing the request. The method may also include: collecting, by said software agent, data about an application executing on the component; and reporting the data to the data storage system. The step of reporting may be performed in response to a request from the data storage system.

In accordance with another aspect of the invention is a data storage system comprising code stored on a computer readable medium for performing automated discovery processing in a computer network, the computer readable medium comprising code stored thereon for: monitoring, by the data storage system, transmissions sent over the computer network; extracting, by the data storage system, one or more data elements from one or more messages included in the transmissions; and determining, by the data storage system, at least one application executing on a component in the computer network in accordance with said one or more data elements. The code for monitoring may monitor network traffic for the computer network using a spanning port. The computer readable medium may also include code for processing data storage requests. The code for extracting may include code for extracting data elements in accordance with at least one internet layer protocol and at least one transport layer protocol. The code for said extracting may include code for extracting data elements in accordance with at least one application layer protocol that is not used by the data storage system in processing said data storage requests. The data storage system may process said I/O requests in accordance with at least one of iSCSI or SCSI and said code for extracting data elements extracts data elements in accordance with at least one application layer protocol used by an application on another component connected to the network.

BRIEF DESCRIPTION OF THE DRAWINGS

Features and advantages of the present invention will become more apparent from the following detailed description of exemplary embodiments thereof taken in conjunction with the accompanying drawings in which:

FIGS. 6-10 illustrate an example of protocols and embedded messages that may be received by the data storage system in connection with monitoring network traffic and elements that may be extracted therefrom for use with application discovery;

DETAILED DESCRIPTION OF
EMBODIMENT(S)

Figure 1:
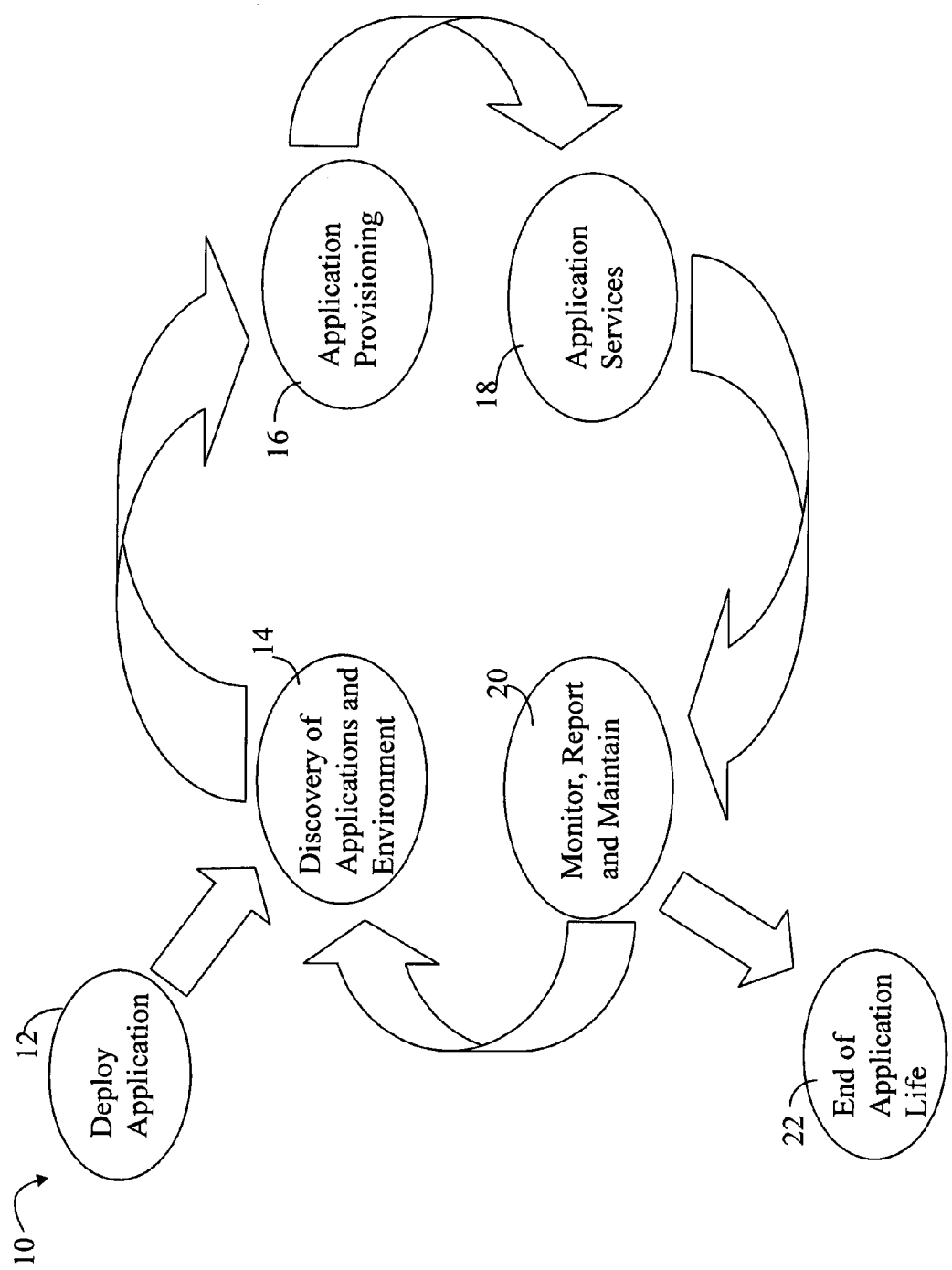
FIG. 1 is an example illustrating a lifecycle that may be associated with an application used in connection with the techniques herein.

Referring to FIG. 1, shown is an example illustrating a lifecycle that may be associated with an application used in connection with the techniques herein. The application may be, for example, a database application, a file system, or an email application, and may execute on a server as will be described in more detail in following paragraphs. The example 10 illustrates the different phases of the application with respect to the data storage configuration, management and data storage services performed with respect to the application. As a first step 12, the application is deployed for use in a system. Step 12 may include installing the application on a server and selecting an initial data storage configuration for the application. From step 12, steps 14, 16, 18 and 20 may be continually performed over the lifetime of the application until the application is retired or no longer used within the system at step 22. Steps 14, 16, 18 and 20 may be performed, for example, as part of a process to initially migrate data storage for the applications to a new data storage system and perform the data storage configuration of the new data storage system in accordance with the application needs. Subsequent to this initial migration, steps 14, 16, 18 and 20 may be performed in an ongoing fashion to discover any new application needs or changes to existing data storage requirements, and make the appropriate data storage modifications with respect to storage capacity and other data services performed on behalf of the application's data storage.

In step 14, automated discovery processing may be performed to determine the applications and the hardware and software environments for the applications as currently existing in a system. As will be described in more detail, the automated discovery processing may be initiated and performed by an intelligent data storage system which automatically scans the network and determines the network and system topology. The data storage system may determine, for example, the different applications executing in a network, the components included in a network, which applications are executing on which components, and various aspects of the different applications including current data storage configuration and/or application performance information. Step 14 results in collecting data characterizing the current data storage configuration and/or storage needs of the executing applications. Such data may be used in connection with provisioning storage in the new data storage system for the applications in step 16 and selecting the appropriate service levels for the different data storage services in step 18 performed for the application. The data storage service in step 18 may include, for example, backup and restoration operations, data protection services such as different levels of RAID protection, and the like. The particular services and level of services may be determined in accordance with the current configuration of the application. At step 20, monitoring and maintenance of the applications and associate data storage system may be performed to ensure that the system is performing as desired. Step 20 may include, for example, examining different metrics regarding application performance and associated data storage. At various points in time, the automated discovery processing 14 may be performed again to collect additional discovery data since the application needs may change over time. Reperforming steps 14, 16, 18 and 20 at different points in time during which the application is used in the system provides for detecting any changes in application needs and behavior with respect to the data storage and data storage services so that appropriate changes can be made. Such changes may be related to, for example, changes in application implementation and functionality such as newly added application features and changes in application usage.

The lifecycle of an application as described above is described in more detail, for example, in U.S. patent application Ser. No. 11/864,040, filed on Sep. 28, 2007, entitled TECHNIQUES FOR SUPPORTING APPLICATION OPERATION, which is incorporated by reference herein.

Processing associated with the automated discovery of step 14 of FIG. 1 is described in more detail in following paragraphs. The data gathered as part of the automated discovery processing may be used, for example, in determining the best practices in connection with performing different operations and services customized for an application as described in U.S. patent application Ser. No. 11/824,578, filed Jun. 29, 2007, entitled APPLICATION AWARE STORAGE, which is incorporated by reference herein.

In following paragraphs, a particular example illustrating use of the automated discovery techniques is described. In connection with existing techniques, when a new data storage system is introduced for use in a network, a customer may be required to manually determine and enter data storage configuration information for the applications which will use the data storage system. Existing techniques are often complex and tedious in requiring the customer to have the necessary knowledge regarding the application and data storage needs and to manually perform multiple steps in order to use the data storage system. Such steps may include, for example, multiple reboots of connected servers, entering IP addresses/network addresses of connected servers, knowledge of best practices for server/application configurations, knowledge of routing from application to storage, and the like.

In connection with the automated discovery techniques described herein, the new data storage system may perform processing to automatically discover connected servers, applications running on the servers, and a variety of information about the applications and data storage. Using the techniques herein, automation and ease-of-use are provided by an intelligent storage system automatically scanning the network to which it is connected as part of initialization, building a map of the network topology, understanding the applications running on those servers, and gathering data to ease the configuration burden of previous techniques.

Figure 2:
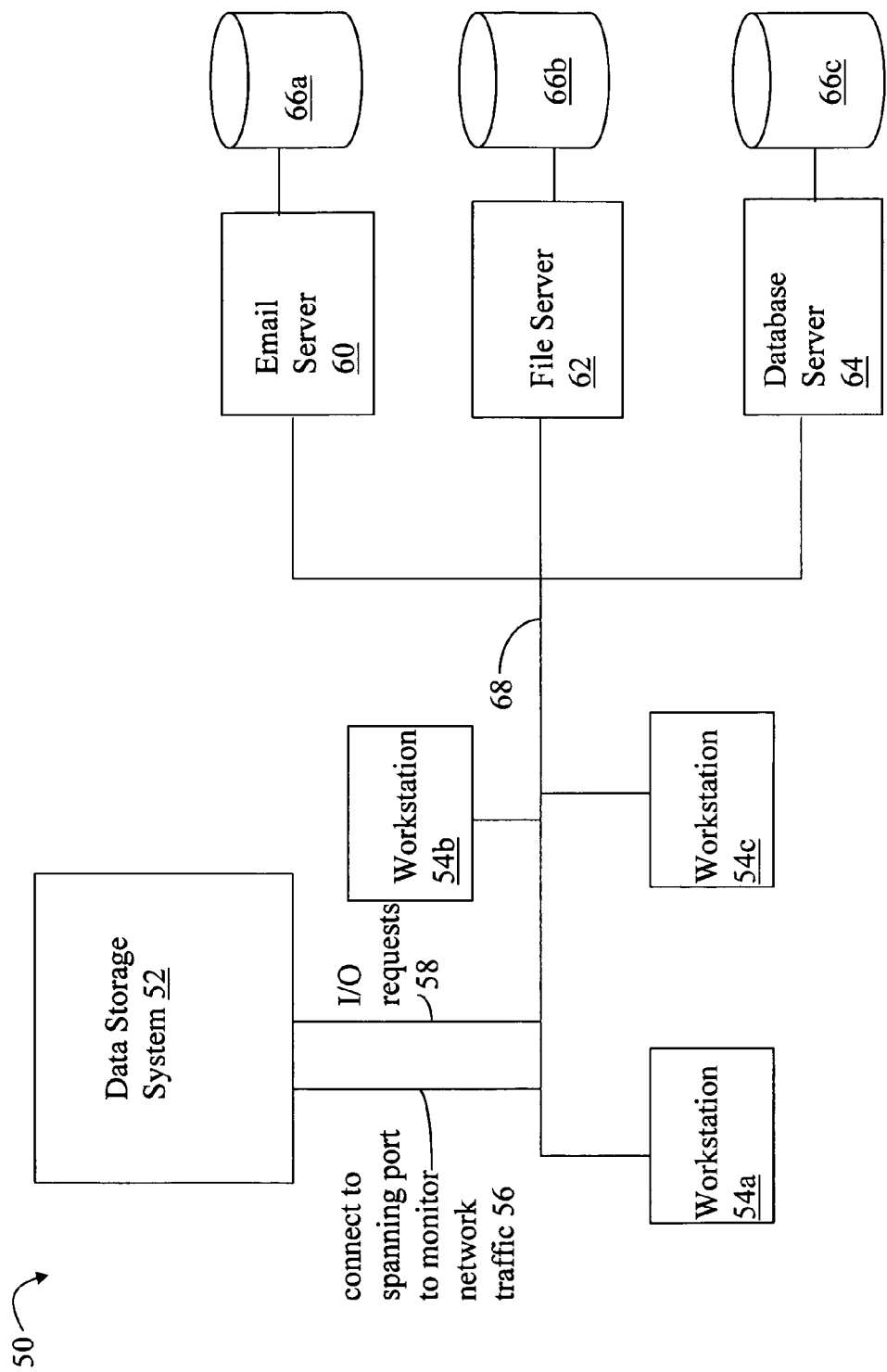
FIG. 2 is an example of an embodiment of a computer system that may utilize the techniques described herein.

Referring to FIG. 2, shown is an example of an embodiment of a computer system that may be used in connection with performing the techniques described herein. The computer system 50 includes one or more data storage systems 52 connected to server or host systems 60, 62, and 64 through communication medium 68. In this example, each of the servers 60, 62 and 64, respectively, utilize storage 66a, 66b and 66c local to each server. As will be described in following paragraphs, each of the servers uses local storage and a new data storage system 52 may be introduced into the network with a goal of provisioning storage in the data storage system 52 for use by the applications executing on the servers 60, 62 and 64. Each of the applications may then use the storage in the data storage system 52 rather than storage local to each server as a primary storage location.

The system 50 also includes one or more workstations 54a-54c, such as management workstations, connected to the one or more data storage systems 52 and servers 60, 62, and 64 through communication medium 68. The communication medium 68 may be any one or more of a variety of networks or other type of communication connections as known to those skilled in the art. The communication medium 68 may be a network connection, bus, and/or other type of data link, such as a hardwire or other connections known in the art. For example, the communication medium 68 may be the Internet, an intranet, network or other wireless or other hardwired connection(s) by which the server systems 60, 62 and 64 may access and communicate with the data storage system 52 and workstations 54a-54c as well as possibly other components (not shown) that may be included in the computer system 50. In one embodiment, the data storage system 52 added to the network may have a communication connection 58 over which I/O requests are received. The data storage system 52 may also communicate over a second connection 56. The connection 56 may be connected to the spanning port of the network providing the data storage system 52 with the ability to receive and monitor all network traffic. It should be noted that although 56 and 58 are illustrated as two separate connections, an embodiment may alternatively utilize a single physical connection if the spanning port also serves as the port for I/O requests. The use of connection 56 and monitoring network traffic is described in more detail elsewhere herein in connection with performing automated discovery processing.

Each of the host or server systems 60, 62, and 64, the workstations 54a-54c, and the data storage system 52 included in the computer system 50 may be connected to the communication medium 68 by any one of a variety of connections as may be provided and supported in accordance with the type of communication medium 68. The processors included in the host or server systems 60, 62, and 64 and workstations 54a-54c may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 52 are described herein in more detail, and may vary with each particular embodiment. Each of the host computers 60, 62 and 64, the workstations 54a-54c, and data storage systems 52 may all be located at the same physical site, or, alternatively, may also be located in different physical locations. In connection with communication medium 68, a variety of different communication protocols may be used such as SCSI, Fibre Channel, iSCSI, TCP/IP, and the like. Some or all of the connections by which the hosts or servers, workstations, and data storage system may be connected to their respective communication medium may pass through other communication devices, such as a Connectrix or other switching equipment that may exist such as a phone line, a repeater, a multiplexer or even a satellite. It should be noted that although FIG. 2 illustrates communications between the hosts or servers, workstations and data storage systems being over a single connection, the hosts or servers may communicate with the data storage systems over an iSCSI or a Fibre Channel connection and the workstations may communicate with the data storage system over a separate network connection using TCP/IP. The particular type and number of connections may vary in accordance with particulars of each embodiment.

Each of the host or server computer systems may perform different types of data operations in accordance with different types of tasks. In the embodiment of FIG. 1, once the data storage system 52 is configured and used in the system, any one of the servers 60, 62 and 64 may issue a data request to the data storage systems 52 to perform a data operation. For example, an application executing on one of the servers 60, 62, and 64 may perform a read or write operation resulting in one or more data requests to the data storage systems 52.

The workstations 54a-54c may be used in connection with management of the data storage systems 52, servers 60, 62, and 64, and applications executing thereon. Each of the workstations 54a-54c may include hardware and/or software components. The workstations 54a-54c may include one or more computer processors connected to one or more I/O devices such as, for example, a display or other output device, and an input device such as, for example, a keyboard, mouse, and the like. A data storage system manager may, for example, view information about a current storage volume configuration on a display device of a workstation 54a-54c.

In one embodiment, the one or more data storage systems 52 of FIG. 2 may be an intelligent data storage system as described in more detail herein. The data storage system 52 may also be implemented as an appliance with hardware and software for hosting the data storage of the one or more applications executing on the servers 60, 62, and 64. The data storage system 52 may include one or more storage processors and one or more devices upon which data is stored. The data storage system 52 may include software used in connection with storing the data of the hosts thereon and also software used in connection with the techniques herein for automatically scanning the network upon initialization, building a network map, determining the applications executing in the network on the particular servers, and gathering data regarding the current storage configuration and current performance of the applications. The foregoing automated process may be characterized as a discovery process for discovering and gathering information about the applications and the hardware and software environments of the applications. The information obtained may be used in connection with configuring the data storage 52 for use by the servers and applications. As an example in connection with an email application server component that may be executed on the server 60, data storage configuration tasks may include allocating storage for user accounts or mailboxes, specifying the devices (logical and/or physical) used to store the email data, specifying whether data replication is performed for disaster recovery, and the like. Techniques herein for automated discovery processing may be used to collect data regarding the current data storage configuration of the email application as well as the current performance of the email application with respect to the current storage configuration. The collected data may be used in connection with other processing such as determining the appropriate data storage configuration for the email application on the data storage system 52. Furthermore, once the data storage system 52 is initially provisioned for use with the email application, the techniques herein may also be used as part of the ongoing process of monitoring the application to determine when modifications to the data storage configuration may be appropriate and necessary. Techniques that may be used in connection with performing automated application discovery by the data storage system 52 and collecting data regarding the various applications are described in more detail in following paragraphs in order to provide ease of use to customers of the data storage system 52.

With reference to FIG. 2, shown are particular examples of applications that may execute on the different servers. The server 60 may be utilized as an email server hosting an email application. The server 62 may be utilized as a file server for one or more different file systems. The server 64 may be utilized as a database server hosting a database application. It will be appreciated by those skilled in the art that the foregoing are exemplary applications that may be hosted on the different servers in a system using the techniques herein. Furthermore, a single server may be configured to host one or more of the same, or different, applications.

Servers or host systems 60, 62, and 64 provide data and access control information through channels to the data storage 52, 66a, 66b, and 66c, and the data storage devices may also provide data to the host systems through the channels. The host or server systems may not address the storage disk drives directly, but rather access to data may be provided to one or more server systems from what the servers view as a plurality of logical devices or logical volumes (LVs). The LVs may or may not correspond to the actual disk drives. For example, one or more LVs may reside on a single physical disk drive. In the data storage system 52, data in a single storage system may be accessed by multiple servers allowing the servers to share the data residing therein. An LV or LUN (logical unit number) may be used to refer to the foregoing logically defined devices or volumes.

In one embodiment, the components of FIG. 2 may be included in a computer network. The data storage system 52 may be introduced as a new component and connected to the computer network to perform the discovery processing herein. The data storage system may operate as a standalone data storage system or may be connected to other data storage systems and other components, for example, as part of a SAN (Storage Area Network) connected to the computer network for which the data storage system is monitoring network traffic over the spanning port.

It should be noted that data storage provisioning for an application may be performed in advance of actually utilizing the provisioned storage for hosting content for the application on the data storage system 52. As such, the techniques herein for application discovery may be performed to discover preliminary local storage used by the applications, for example, for the applications having data hosted locally on devices 66a, 66b and 66c. Data may then be provisioned on the data storage system 52 for the applications. At some later point in time, the applications utilize the data storage system 52 for hosting their application data and the content from the previously used local storage, such as from devices 66a, 66b and 66c, may be migrated to the data storage system 52 for use with the applications.

Figure 3:
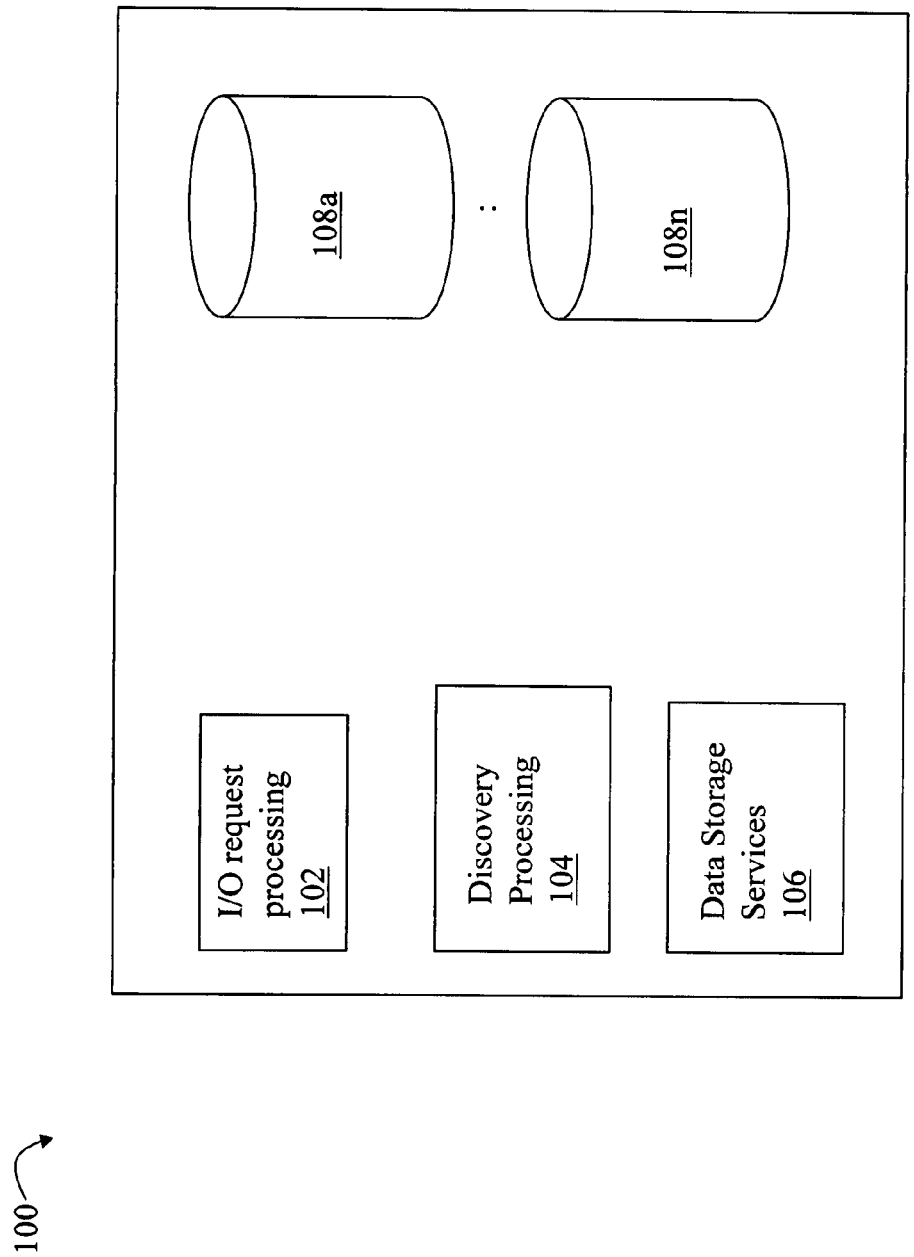
FIG. 3 is an example of components that may be included in an embodiment of a data storage system.

Referring to FIG. 3, shown is an illustration of components that may be included in the data storage system 52 of FIG. 2. The data storage system may include one or more data storage devices, such as disks 108a-108n. The data storage system 100 may also include one or more software components logically represented as performing I/O request processing 102, discovery processing 104, and data storage services 106. Element 102 represents the components used in connection with processing I/O or data requests such as, for example, read and write requests. Element 106 represents the components used in connection with performing different data services. For example, the data storage system may include backup server software which interacts with software on the servers 60, 62 and 64 when performing a backup operation. Element 104 represents the components used in connection with performing automated discovery processing as described above and in more detail in following paragraphs.

It should be noted that although only a single data storage system is illustrated, a system may utilize one or more data storage systems that may be manufactured by the same, as well as one or more different, vendors. Each of the data storage systems may be inter-connected (not shown). Each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In an embodiment with one or more data storage systems, each of the data storage systems may include code thereon for performing the techniques as described herein as well as code for communicating with other data storage systems.

In following paragraphs, reference may be made to a particular embodiment such as, for example, an embodiment in which the data storage system 52 of FIG. 1 is an appliance as described above. However, it will be appreciated by those skilled in the art that this is for purposes of illustration and should not be construed as a limitation of the techniques herein.

Described in following paragraphs are techniques that may be used to assist customers of a data storage system in connection with automated discovery processing. In the example described above, the techniques herein may be used to migrate and configure the data storage for the different applications of FIG. 2 to utilize the data storage system 52. The discovery process may be automatically performed to obtain the data needed in order to provision the data storage for the applications and select the appropriate service parameters for the different data storage services for the applications. For example, the discovery process may determine the applications and information about the applications. Such information may include the current data storage configuration as well as performance information regarding application performance with respect to the current configuration. Such performance information may serve as an indicator that a change in the current configuration may be desirable. Such information may be used to determine the amount of data storage used and needed by the application, select appropriate devices having the desired characteristics, determine appropriate parameters for the different services (e.g., level of data protection), and the like. The data collected as a result of the automated discovery processing may be used to determine best practices. The automated discovery processing techniques described herein are flexible and allow for implementation of best practices and defaults which are customized for the particular application, user or customer, and/or underlying data storage system and environment to meet specific customer needs. As will also be described, any modification or extension to the automated discovery process may be made by updating software included in the data storage system. For example, if additional discovery data is collected, the software performing the discovery processing 104 may be updated to automatically collect the additional data the next time discovery processing is performed.

What will now be described are the different types of data that may be colleted as part of the automated discovery processing.

The discovery processing may identify the hardware or physical environment in which the data storage system is included. Such information may include the network topology such as identifying the different components and how they are connected. The components may include the host or server systems, the workstations, existing data storage systems, and connectivity between the different components. For each server, server characteristics may be obtained. Server characteristics may include current processing rates and processing capacity in order to assess the processing potential and current usage of the servers. Data related to the current storage configuration, capacity, and current performance information for the current storage configuration may be collected. This may include, for example, the number of physical and logical devices, device characteristics such as device capacity, speed, current data protection (e.g., RAID protection level in use). In connection with determining the hardware and physical environment in which the data storage system will operate, the data storage system may determine the number of host bus adapters and switches, if there are any connected networks, whether the data storage system is included in a storage area network (SAN), LAN, and the like.

The discovery data may also identify any virtual infrastructure such as, for example, whether there are any virtualized servers, what virtual servers are configured to run on which physical server, and the like. The operating systems of the different components having connectivity to the data storage system are identified. The particular version number as well as patch or update level may also be identified.

The discovery data may identify the applications and application topology such as, for example, what application is running on what physical and/or virtual server. The discovery data may include information regarding how the application is configured such as the type of storage and storage characteristics currently allocated for use by the application (e.g., number, size and location of LUNs), performance information regarding the application with respect to the current data storage configuration, and the like. The discovery data may include other application-specific parameters. For example, for an email application, the discovery data may identify the number of storage groups, the size of the storage groups, number of requests to the email application, and how is application data protected (e.g., backup type and frequency, current RAID protection level).

In connection with the automated discovery process, varying levels, amounts and types of discovery data may be collected. Different techniques may be used in accordance with the amount and type of discovery data to be collected. Particular types of discovery data may require that more intrusive or invasive procedures be used than for other types of discovery data. The techniques used for data collection may also vary with the particular operating system or other existing software included in an embodiment. The techniques used may also vary with the number of servers and other components in a customer site. For example, different techniques may be used for data collection in a system having 200 servers, such as enterprise environment, versus another system having only a handful of servers, such as may be the case with a small business.

One way in which the data storage system may collect discovery data is by monitoring network traffic. This may be performed through use of monitoring the network transmissions over connection 56 as described in connection with FIG. 2. Software executing on the data storage system may monitor the network traffic. As part of this monitoring, the discovery processing software on the data storage system may perform a variety of different tasks and understand a variety of different protocols used. For example, the data storage system may parse the network transmissions in accordance with the particular protocols utilized to extract various elements of discovery data. This is described in more detail in following paragraphs. By monitoring the network traffic, the data storage system is able to determine information regarding the hardware and physical environment and network topology such as the servers, applications executing on particular servers or other components (e.g., switches, routers, hubs, other appliances), IP addresses of the different components, what storage devices are used by an application as included in an I/O request, and the like. In connection with the automated discovery processing, monitoring network traffic to collect discovery data may be characterized as a passive mode.

Using the techniques herein, simply incorporating the data storage system on the network may result in performing the passive discovery mode, for example, as part of data storage system initialization processing. The passive mode may result in obtaining a portion of the desired discovery information. Alternatively, all the discovery information desired may be obtained in connection with the passive mode processing. The automated discovery techniques described herein are adaptive in that it is not necessary to obtain a particular amount of discovery data. The level of data discovery performed may be customized based on the network and system being analyzed. If there is a more complex environment, it may be desirable to obtain more data than with simpler, less complex systems.

Besides passive discovery, an embodiment may also utilize other techniques in connection with performing active discovery mode processing. A first type of active discovery mode processing uses information obtained from the passive mode processing and also leverages existing software already on the different components to collect additional discovery data. As an example with reference to FIG. 2, the data storage system may perform passive mode discovery processing for a time period and determine the particular servers 60, 62, 64 and applications executing on each. Using this information, the data storage system may then perform additional processing to obtain additional discovery data regarding each of the servers and applications by utilizing software on the servers. For example, if the servers are each running a Windows®-based operating system, the WMI (Windows Management Instrumentation) interface may be used for obtaining discovery data regarding the server and/or application executing on the server. The data storage system may use WMI to query, change, and/or monitor configuration settings on desktop and server systems, applications, networks, and other enterprise components. System administrators may, for example, write scripts that use the WMI Scripting Library to work with WMI and create a wide range of systems management and monitoring scripts. The execution of these scripts may be initiated by the data storage system as part of discovery processing. As a further example, WMI may be used to obtain data from different providers on the server such as data and notification regarding event logging, installed application, performance data regarding runtime and utilization of server resources, and data and events from SNMP devices.

SNMP devices may include code thereon for use in management of different SNMP devices. The data storage system may communicate with the devices using the Simple Network Management Protocol. As known in the art, SNMP is a network management protocol used in networks, such as TCP/IP networks, to monitor and control network devices, manage configurations, and collect data regarding statistics and performance.

It should be noted that the particular software may vary with each embodiment and components included therein. Furthermore, it may be necessary to provide the data storage system with authentication data (e.g., login information) or other information in order for the data storage system to obtain the active discovery data leveraging existing software.

As another example, the data storage system may utilize SSH (Secure Shell). As known in the art, SSH is a network protocol that allows data to be exchanged over a secure channel between two components. Encryption provides confidentiality and integrity of data. SSH uses public-key cryptography to authenticate a remote component, such as the data storage system. SSH may be used with an SSH client software component that may be included on one of the hosts or server and supports SSH exec requests from the data storage system (frequently embedded in other software, e.g. a network monitoring program) for automated remote monitoring and management of servers. SSH may be used by the data storage system, with appropriate authentication information, to query a server for server characteristics and performance data.

The active mode as just described may be used to obtain more detail application information without installing additional software. For example, an existing API, agent or other software on a server may provide information regarding an email application hosted on the server. The information may include data regarding internal application storage configuration such as the number of storage groups.

In addition to the foregoing first active mode leveraging existing software, a second type of active mode discovery processing may be performed which uses an agent installed on the different components to obtain discovery data. The second type of active mode discovery processing may be characterized as more invasive or intrusive than the first active mode and passive mode in that additional software is installed at various points in the network. As will be described in connection with this second active mode, agent software may be downloaded from the data storage system and installed on various components of the network. The agents may be installed, for example, remotely by logging onto a management workstation which causes the agent software to be downloaded (e.g., pushed) from the data storage system to the different servers or other components. The foregoing may be performed by executing a network management script and may be desirable for installation in an enterprise system having many servers. Using another technique, the agent may be installed on a server or other component by logging into the component and connecting to the data storage system, such as via a web browser, to download the agent software to the component. This latter technique may be desirable in connection with an embodiment having a small number of components for which an agent is to be installed for active discovery processing.

In connection with the automated discovery processing described herein, the data storage system includes and executes the discovery processing software to initiate and perform discovery processing. The data storage system automatically learns about the existing network to which it is connected and performs the discovery data collection used in connection with hosting data on the data storage system. In other words, the data storage system learns about the applications and environments for which the data storage will be hosting the data. The discovery data may be used, for example, in determining best practices to facilitate data storage configuration and services for application data hosted on the data storage system.

Figure 4:
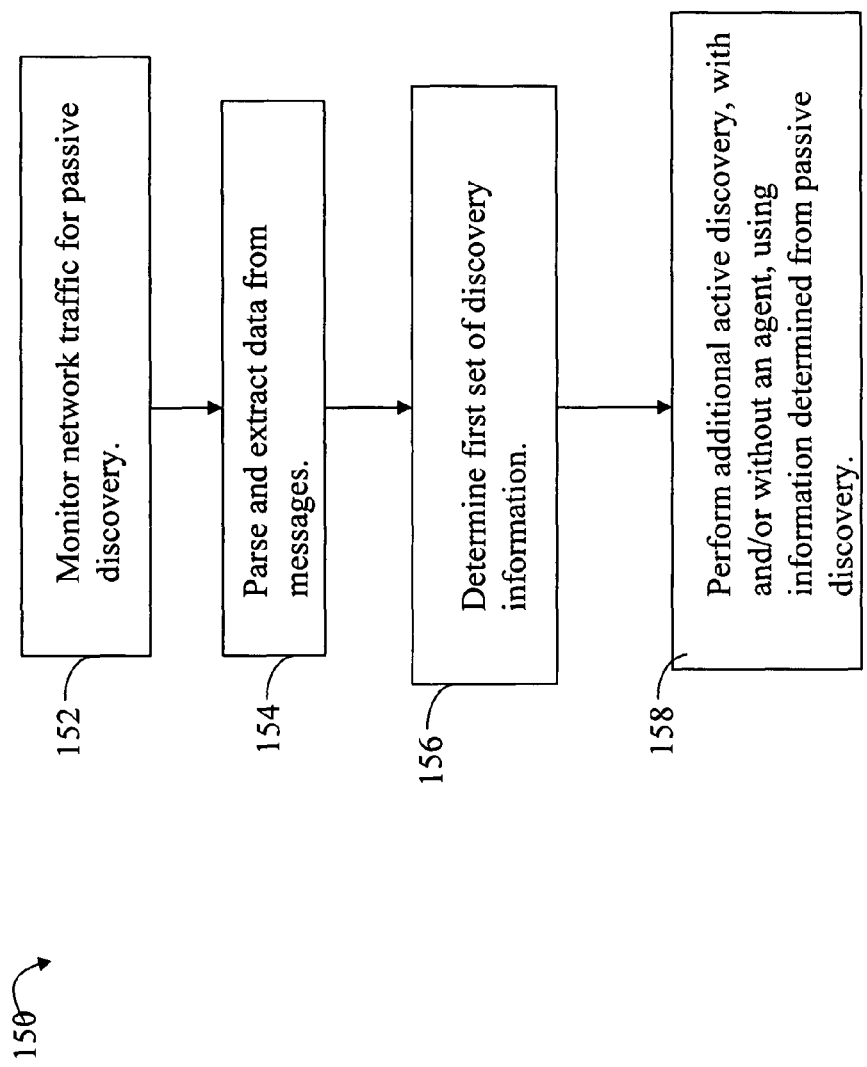
FIG. 4 is a flowchart of processing steps that may be performed in an embodiment in connection with automated application discovery.

Referring to FIG. 4, shown is a flowchart of processing steps describing the different levels of discovery processing that may be performed in an embodiment. The steps of 150 summarize the different modes and levels of discovery processing that may be performed in an embodiment. At step 152, the data storage system may monitor network traffic for passive discovery mode processing. At step 154, the data storage system may parse and extract data from the message transmissions obtained in step 154. As part of step 154, the data storage system may utilize rules for determining what data elements to be extracted from each message as well as the location of the data elements in the messages in accordance with the different protocol that may be included in an embodiment. At step 156, a first set of discovery information may be determined based on the passive discovery processing. Such information in the first set may identify, for example, the servers and applications executing thereon. Using this first set of discovery information, or portions thereof, step 158 may be performed to obtain additional discovery data. Step 158 may include performing additional active discovery with and/or without installation of an additional discovery agent. Step 158 may use the applications, servers and other components identified from step 156 to determine the set of elements about which additional discovery data is desired.

The flowchart 150 identifies processing that may be performed in an embodiment desiring passive mode discovery and some form of active mode discovery processing. It should be noted that an embodiment may also omit step 158 and only perform passive mode processing. As described elsewhere herein, the discovery processing techniques herein are adaptive in that varying amounts of discovery data may be obtained and utilized.

In connection with monitoring network traffic as part of the passive mode processing, the data storage system is capable of parsing transmissions in accordance with any one or more different protocols depending on those used in an embodiment. Additionally, the data storage system extracts particular data elements of interest from appropriate locations in the transmissions.

In one embodiment, the data storage system is able to understand a variety of different protocols utilized in accordance with the OSI Reference Model having the following 7 layers, from lowest (e.g., Level 1) to highest (Level 7): physical, link, network, transport, session, presentation, and application. At each level, a variety of different protocols may be utilized and understood by the data storage system.

Figure 5:
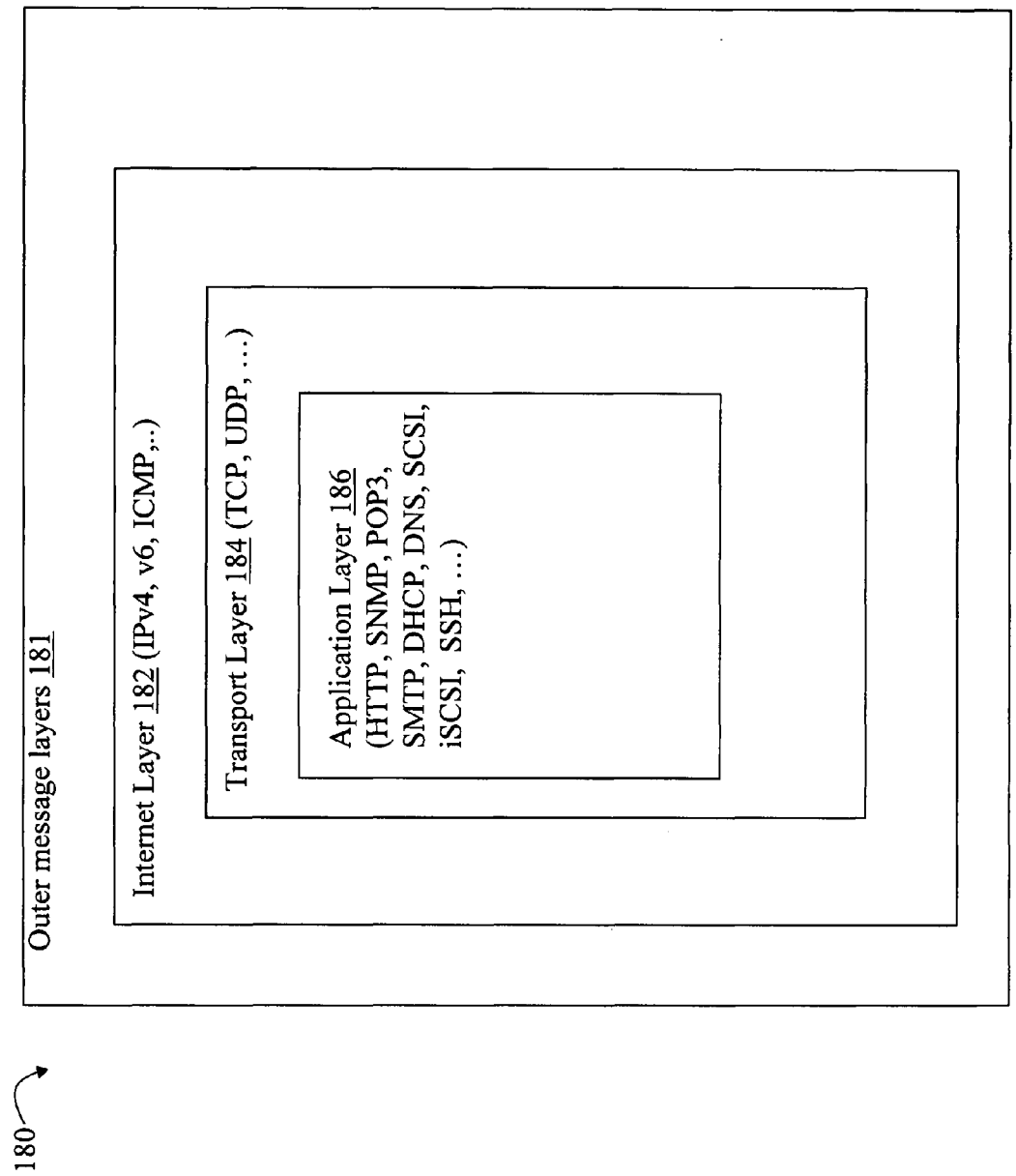
FIG. 5 is an example illustrating the different messages and protocols that may be understood by a data storage system in connection with monitoring network traffic.

Referring to FIG. 5, shown is an example representation of a message that may be obtained from monitoring network traffic. The example 180 illustrates the various layering that may be included in a message. Generally, data relevant to a higher level or embedded layer may be encapsulated within another data portion of an outer layer. In other words, as you move progressively to higher layers in the model from a first layer to second layer, data portions relevant to the second layer are embedded within the outer layers. With respect to the example 180, layer 182 corresponds to protocols used with the internet or network layer 3, transport layer 184 corresponds to protocols used with the transport layer 4, and the application layer corresponds to protocols used with the application layer 7. Element 181 represents portions of the message used in connection with protocols of layers 1 and 2. Also embedded within element 184 and outside of 186 may be data used in connection with layers 5 and 6.

In connection with the techniques herein, the data storage system is capable of parsing transmissions in accordance with the variety of different protocols at each layer to obtain the discovery data therefrom. Code included in the data storage system may be used to process the received transmission to retrieve the particular data elements of interest in accordance with the various protocols supported in an embodiment.

At the network or internet layer 182, exemplary protocols may include IP (Internet Protocol) v4, IPv6, and ICMP (Internet Control Message Protocol). At the transport layer, exemplary protocols may include TCP (Transmission Control Protocol) and UDP (User Datagram Protocol). Exemplary protocols used at the application layer 186 may include HTTP (Hyper Text Transfer Protocol), SNMP (Simple Network Management Protocol), POP3 (Post Office Protocol 3), SMTP (Simple Mail Transport Protocol), DHCP (Dynamic Host Control Protocol), SCSI (Small Computer System Interface), iSCSI (Internet Small Computer System Interface), and SSH. The protocols used at the application layer 186 vary with the particular application, such as the email application, database application, file system application, and the like, which is sending/receiving the transmission. In connection with traditional data storage systems, I/O requests may be made in accordance with the SCSI and iSCSI protocols. Other applications, such as the email application, may utilize the POP3 and/or SMTP protocols. Thus, in order to perform the passive discovery mode processing, the data storage system needs to be able to understand those protocols typically used at the various layers by data storage systems, such as the SCSI and iSCSI application layer protocols, as well as those protocols of other applications and components in the system.

What will now be described is a particular example of the transmissions and protocols that may be retrieved by the data storage system as part of the passive mode discovery when monitoring network traffic.

Figure 6:
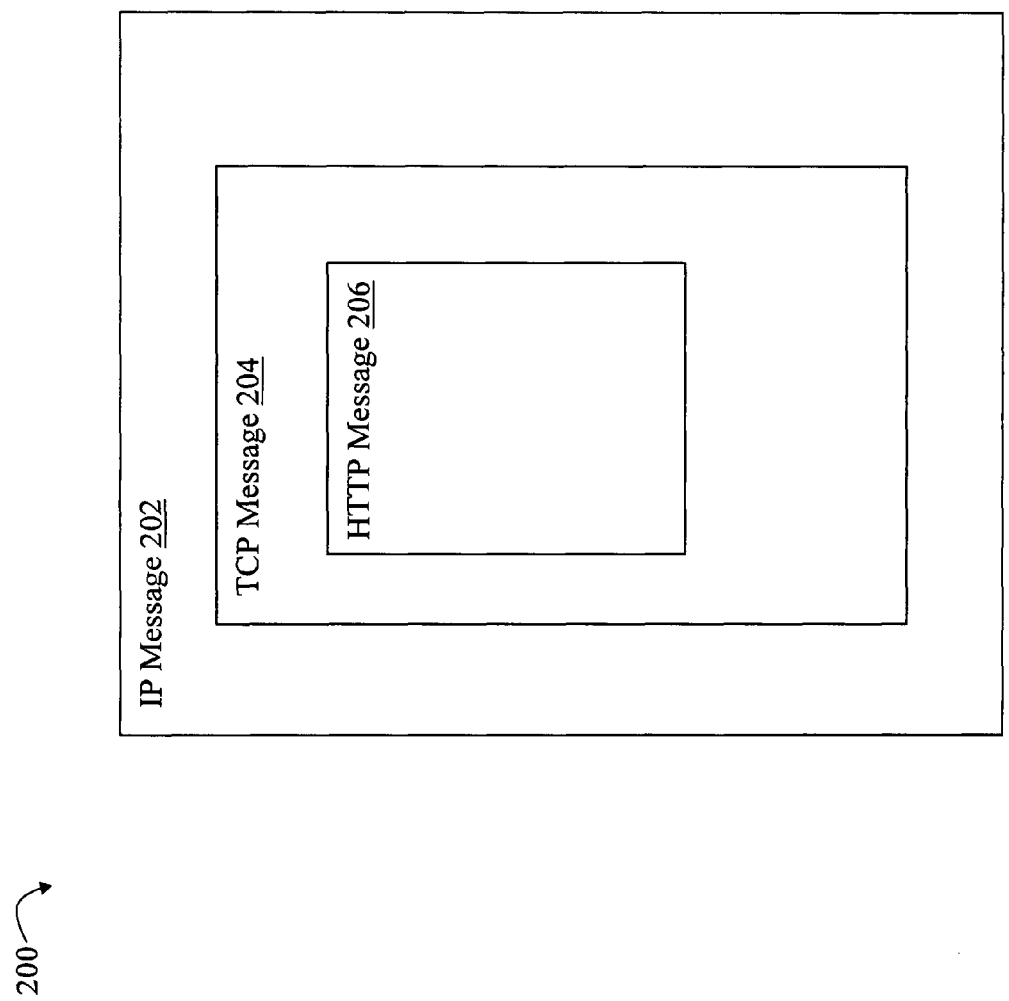

Referring to FIG. 6, shown is an example representation of a message that may be obtained from monitoring network traffic. The example 200 illustrates an IP message 202 which includes the TCP message 204 as part of the IP message 202. As described herein, code may be executed on the data storage system, such as data storage system 52 of FIG. 2, to parse the message 200 as obtained by monitoring transmissions over a TCP/IP connection. Included in the TCP message 204 is an HTTP message.

As known in the art, the IP is a network layer protocol that contains addressing information and some control information enabling packets to be routed. As described above, the network layer corresponds to Layer 3 of the OSI Reference Model. TCP is a transport layer protocol that provides for reliable transmission of data in an IP environment. The transport layer corresponds to Layer 4 of the OSI Reference Model. HTTP is an example of an application protocol that may be used in connection with Layer 7, the application layer. HTTP is an application protocol used, for example, by web browsers when communicating with a server hosting web page content.

In the example, 200, a first message format, such as HTTP, is encapsulated within another message format, such as that of a TCP/IP message. It should be noted that although both HTTP and TCP/IP are described herein for purposes of illustration, other messaging formats and protocols may be used in connection with the techniques herein. For example, the HTTP message may be encapsulated in accordance with another format besides TCP/IP depending on the network over which the message is sent, or another message using a different application layer protocol besides HTTP may be encapsulated in the TCP/IP message.

Figure 7:
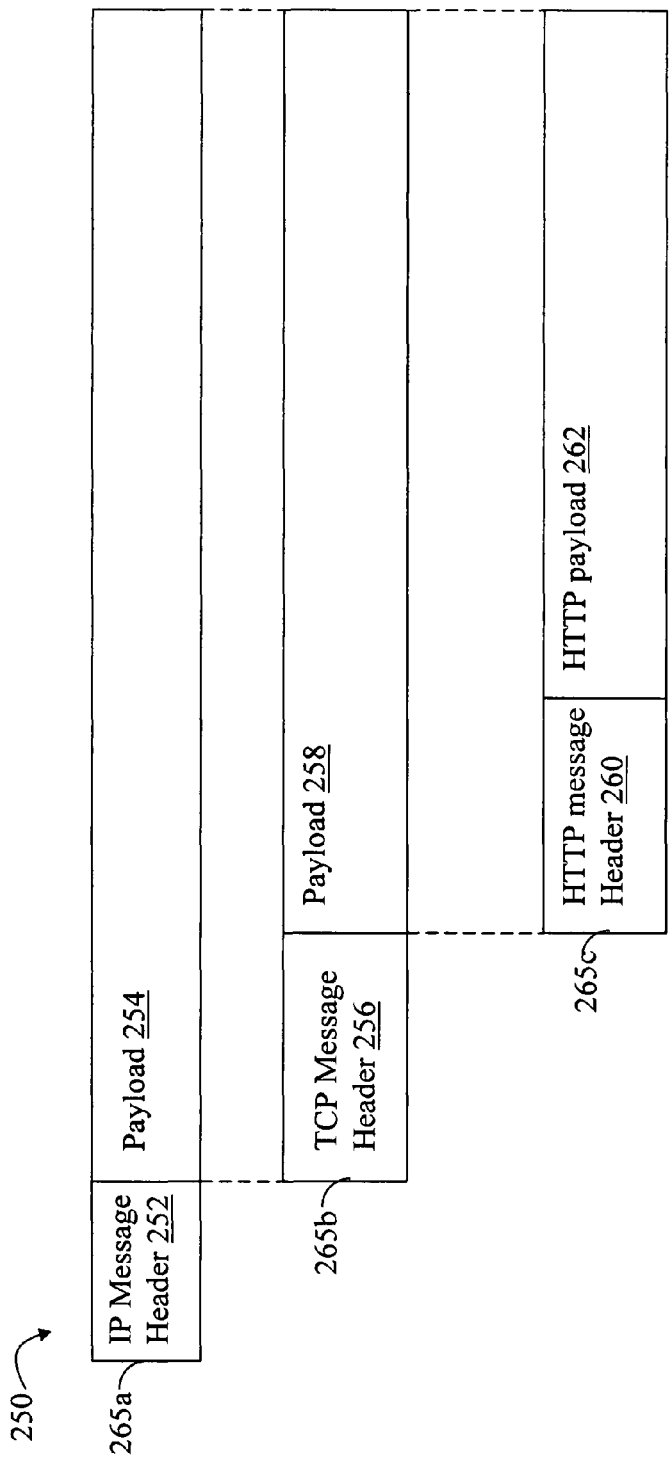

Referring now to FIG. 7, shown is an example illustrating a message that may be transmitted over a TCP/IP network. The example 250 includes additional detail on the portions of the message and encapsulation. The IP message 265a includes an IP message header 252 and a payload 254. The payload 254 of the IP message 265a includes the TCP message 265b. The TCP message 265b includes a TCP message header 256 and payload 258. The payload 258 of the TCP message 265b includes an HTTP message 265c. The HTTP message 265c includes an HTTP message header 260 and payload 262.

Processing may be performed on the data storage system to extract desired information from the different messages in accordance with the supported protocols and formats. The code on the data storage system may parse a received transmission in accordance with the different protocol formats to obtain one or more data elements of interest at the various layers.

Referring now to FIG. 8, shown is an example of fields that may be included in the IP header portion. The example 270 provides additional detail of element 252 of FIG. 7. The example 270 illustrates the IP header as including a version number 272, a source address 274, a destination address 276, and other information in accordance with the particular IP format. The source address 274 and destination address 276 may each specify an IP address, respectively, the sending and receiving IP addresses of the message including the IP header. Information included in the IP header, such as the version number 272, may be used to identify the header length that may vary with IP version. Such information may also be used to determine the beginning of the payload 254 of the IP message in order to extract the TCP message included therein.

As part of the automated discovery processing, the data storage system may include code which extracts one or more fields of interest from the IP header of FIG. 8. For example, the source address 274 and destination address 276 may be extracted from a transmission in order to determine the addresses of components in the network connected to the data storage system.

Embedded in the data portion or payload of the IP message is the TCP layer message data.

Referring now to FIG. 9, shown is an example of fields that may be included in the TCP header portion. The example 280 provides additional detail of element 256 of FIG. 7. In this example, the TCP header may include a source port 282, destination port 284, data offset 286, and other information in accordance with the TCP format. The data offset 286 may be used to determine the start of the data portion or payload 258 of the TCP message 265*b*. The source port 282 and destination port 284 may each specify, respectively, the sending and receiving ports of the message including the TCP header portion.

As part of the automated discovery processing, the data storage system may include code which extracts one or more fields of interest from the TCP header of FIG. 9. For example, the source port 282 and destination port 284 may be extracted from a transmission to obtain addresses of components in the network connected to the data storage system. The data offset 286 may be used to determine the data portion or payload of the message. Embedded in this data portion or payload is the application layer data that will be described in connection with FIG. 10.

Figure 10:
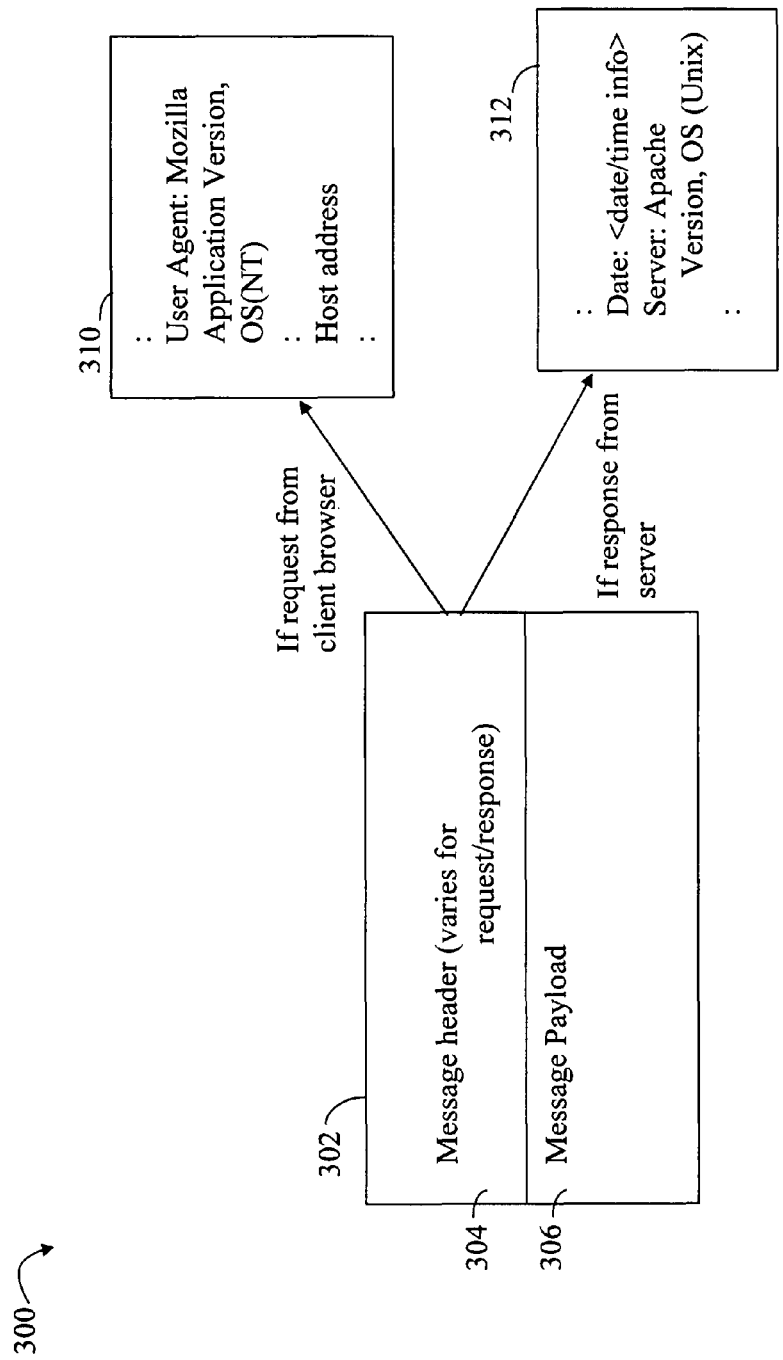

Referring to FIG. 10, shown is an example of fields that may be included in an HTTP message. The HTTP message data 302 includes a message header 304 and payload 306. As known in the art and in accordance with the HTTP protocol, an HTTP message may be a request or a response. The message header 304 may include different information depending on whether the message 302 is a request or response. If the message 302 is a request, the header portion 302 may include exemplary data as represented in 310. Element 310 identifies the host address issuing the request. The host address may be in the form of a host name with an optional port. (e.g., a.b.c.d: <port number>). The client application, represented as "user agent", may indicate information about the application which issued the request. As illustrated, the user agent data may identify the particular web server (e.g., Mozilla), associated version number, and operating system upon which the application is executing.

If the message 302 is a response, the header portion 302 may include exemplary data as represented in 312. Element 312 identifies the date/time of the response and information about the server sending the response. The server information may identify the particular software, such as the Apache server, associated version information, and operating system upon which the server is executing.

As part of the automated discovery processing, the data storage system may include code which extracts one or more fields of interest from the HTTP message of FIG. 10. For example, for a request, the user agent and host address information may be extracted. Further associations may be made between the data extracted from the HTTP message and data extracted at other levels from the same transmission, such as the IP address information (e.g., see 274 and 276 of FIG. 8), and port information (e.g., see 282 and 284 of FIG. 9).

As a further example, the application protocol may be SMTP or POP3 and the data extracted at the application level may identify information about the particular email application used to send/receive the transmission.

By extracting such information as illustrated above, the first set of discovery information may be obtained. The first set of discovery information may identify the various servers or other components and applications executing thereon. Further inquiries may be made as part of active mode discovery processing in connection with the foregoing servers and/or applications discovered as a result of the passive mode discovery processing.

Figure 11:
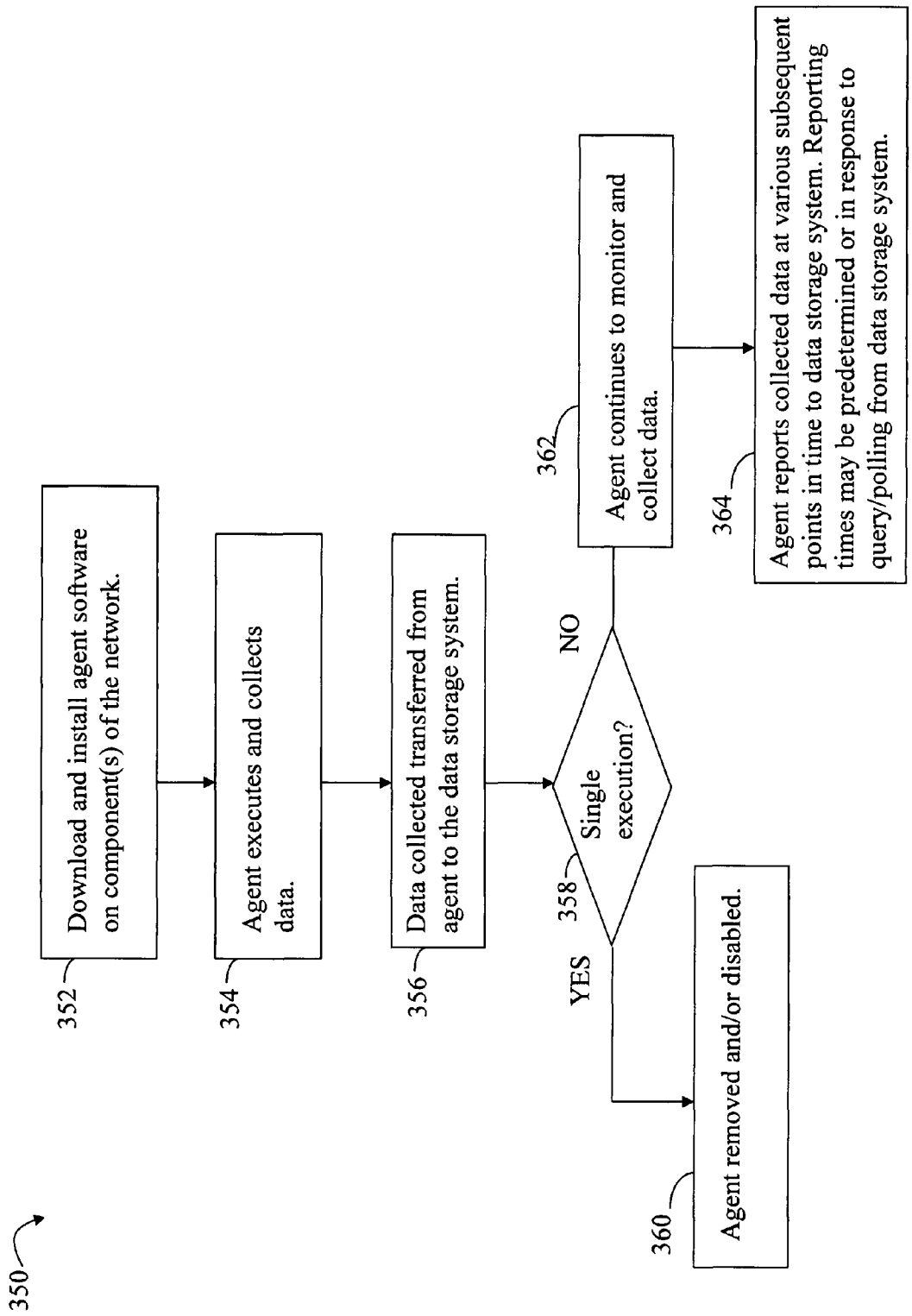
FIG. 11 is a flowchart of processing steps that may be performed in connection with active discovery processing using an agent installed on a server or other component of the network.

Referring to FIG. 11, shown is a flowchart of processing steps that may be performed in an embodiment in connection with performing active discovery using an agent. At step 352, the agent software is downloaded and installed on the one or more components from which data is to be collected. At step 354, the agent on the component executes and collects data regarding the component on which it is installed. At step 356, the data collected is transferred from the agent to the data storage system. At step 358, a determination may be made as to whether the agent is performing data collection in accordance with a single execution mode. In connection with a single execution mode, the agent may be downloaded and data collection may be performed for a single instance. If in single execution mode, step 358 evaluates to yes and control proceeds to step 360 where the agent software may be removed from the component. The next time the discovery agent is to perform data collection, the agent must be enabled or otherwise downloaded (if it has been removed). As an alternative, the agent software may remain on the component to which it was installed in step 352, but the agent software may be disabled and not otherwise enabled to perform data collection. In contrast to the single execution mode, the agent may be enabled to perform continuous monitoring and data collection. In this instance, step 358 evaluates to no and control proceeds to step 362 where the agent continues to monitor the component upon which it is installed and collect relevant data. At step 364, the agent reports the collected data to the data storage system. Such reporting may be performed using any one of a variety of different techniques. For example, the agent may proactively report collected data at various points in time to the data storage system. The reporting times as well as collection intervals may be predetermined, and/or in response to query/polling from the data storage system.

It should be noted that an embodiment may provide for the agent to be downloaded and installed at one point in time and the commence data collection at a second later point in time rather than immediately after installation.

The agent software may collect configuration data regarding the current configuration of the component and software (such as application(s)) thereon. The data collected by the agent may also be related to performance and/or utilization of the component and its resources with respect to the application. For example, in connection with a database application on a server, data may be collected regarding the database requests received, I/O transactions for the data storage devices used by the database application, percent of CPU utilization and other resources associated with the database application, and the like. It should be noted that some information collected using the discovery agent may also be collected using available APIs in an embodiment. The discovery agent may be used to obtain more detailed information that may not otherwise be available using existing software on a component.

Figure 12:
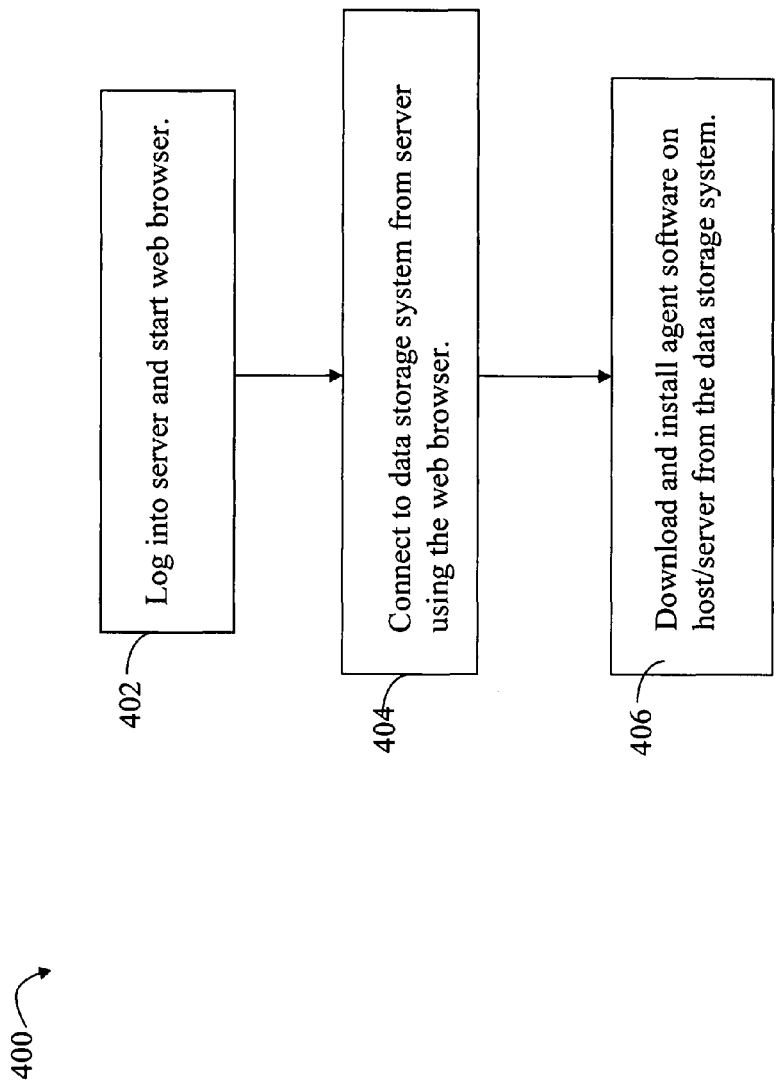
FIGS. 12 and 13 are flowcharts of processing steps that may be performed in an embodiment to install an agent on a component of the network.
Figure 13:
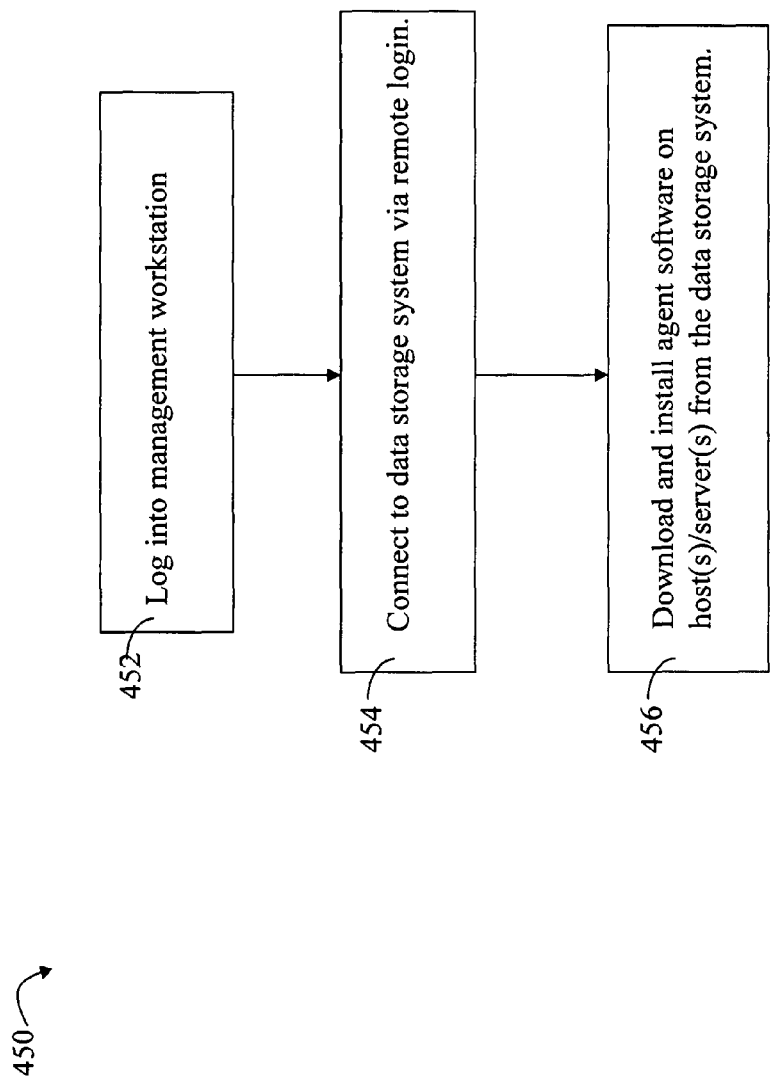

What will now be described in connection with FIGS. 12 and 13 are various ways in which the discovery agent software may be installed on a component as mentioned elsewhere herein.

Referring to FIG. 12, shown is a flowchart of processing steps that may be performed to install the discovery agent software on a component. The flowchart 400 outlines steps that may be used when the agent is installed via a data pull operation in which there is a request from component to the data storage system for the agent software. The agent software is then downloaded and installed on the component, such as the host/server. In the example 400, a host or server is the component upon which the discovery agent software is installed although the agent software may also be installed on other components to facilitate discovery data collection. At step 402, a user logs into the server. A web browser may then be started on the server and used to connect to the data storage system, as in step 404. At step 406, a request is made to download and install the agent software from the data storage system. The foregoing installation outline in 400 may be desirable in a system having a relatively small number of servers or other components upon which the agent is to be installed since each server is logged into individually and a request is then made to download the agent.

Referring to FIG. 13, shown are processing steps that may performed in connection with a second way in which the discovery agent may be installed on a component. In connection with the second installation method of 450, the point of initiation to download and install the agent software is from a management console or workstation. A user may log into a single management workstation which remotely initiates download and installation of the discovery agent software on one or more components. The processing of 450 describes the agent software download being initiated from a central point for multiple components in which the agent software is pushed from the data storage systems to the one or more components. The foregoing may be performed, for example, by executing a network management script. At step 452, a user, such as an administrator, logs into a management workstation. From the management workstation, there is a connection initiated to the data storage system such as via remote login, as in step 454. At step 456, the agent software is downloaded and installed on the host/server or other components.

In connection with the discovery agent installation as described in FIGS. 12 and 13, the data storage system performs processing as a download server to download the agent software.

Figure 14:
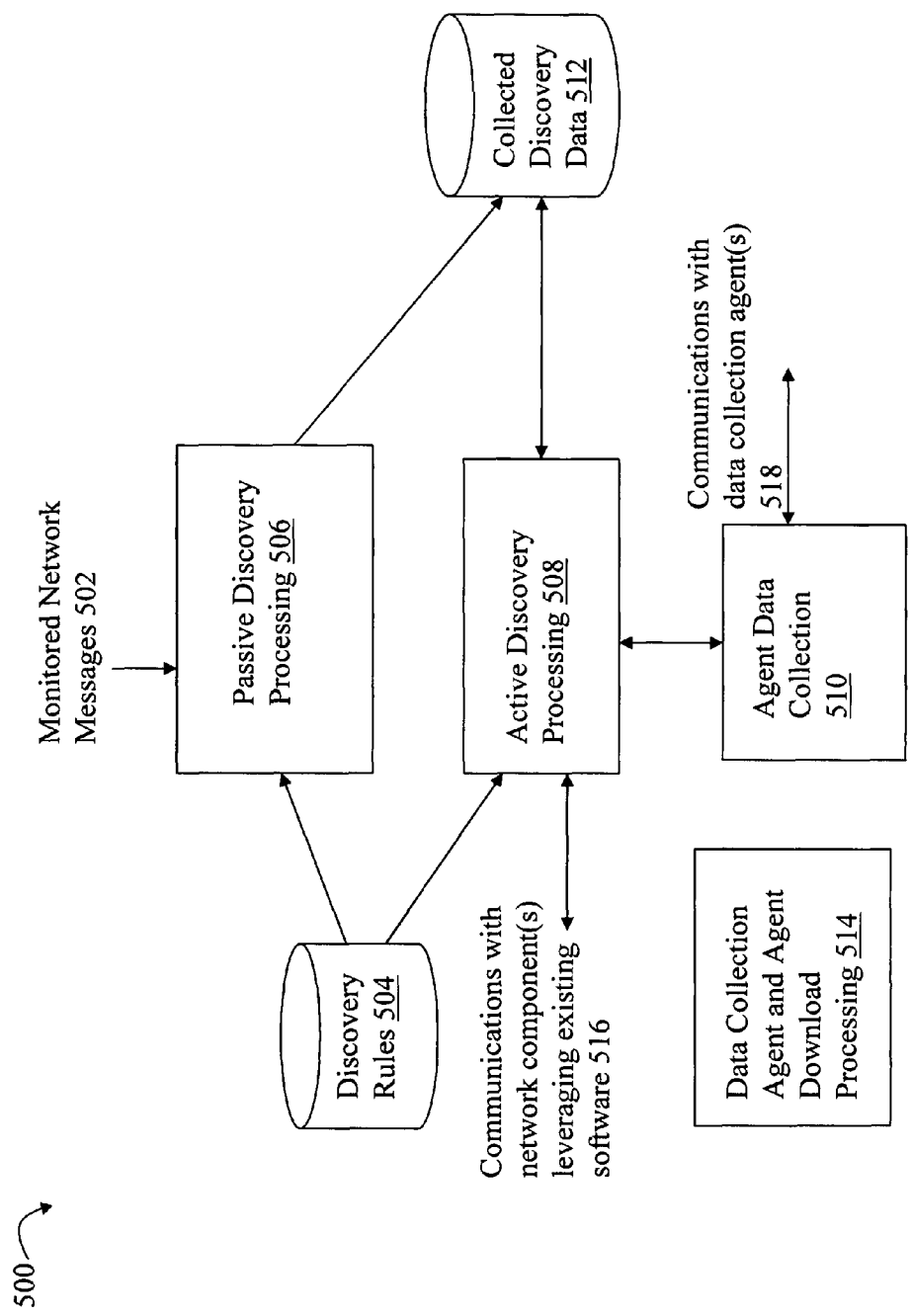
FIG. 14 illustrates in more detail a logical representation of components that may be included in an embodiment for performing automated application discovery processing.

Referring to FIG. 14, shown is a logical representation of components that may perform discovery processing. The example 500 illustrates in more detail element 104 of FIG. 3. It should be noted that processing performed be each element of the example 500 may be done by one or more components included in the data storage system. The example 500 includes passive discovery processing 506, active discovery processing 508, agent data collection 510, data collection agent and agent download processing 514, discovery rules 504 and collected discovery data 512. The passive discovery processing 506 may monitor network message traffic 502 such as over connection 56 illustrated in FIG. 2. As part of the passive discovery processing 506, the messages 502 are parsed in accordance with the various protocols as may be utilized in an embodiment. The discovery rules 504 may indicate, in accordance with the various protocol formats, the data elements to be extracted from the messages 502. As will be appreciated by those skilled in the art, knowledge regarding the various protocol formats may also be embedded in coding logic of the software modules. The discovery rules 504 may identify, for example, the various data elements to be extracted from the HTTP header as described above in accordance with the HTTP protocol. Once the data has been extracted from the messages 502 in accordance with the discovery rules 504, the passive discovery processing stores the extracted data in the collected discovery data store 512. As part of processing of the active discovery, element 508 may use an input the discovery data generated by 506. As described above, the passive discovery processing 506 may determine the various applications executing on the servers. The active discovery processing 508 may use the application list determined by 506 to determine which applications to inquire additional information about. In connection with the first active discovery mode as described above, existing software on various components may be utilized to obtain additional discovery data as illustrated in 516. In connection with the second active discovery mode as described above, discovery agent software may be installed on one or more components in communication with the data storage system. Data collection from the various agents may be performed by the agent data collection 510 by communicating with the various agents 518 installed on the different components. The data collected from the agents may be forwarded from 510 to the active discovery processing 508 which, based on data received from 516 and 510, may updated the discovery data 512.

Element 514 represents the agent software as may be downloaded from the data storage system and installed on the servers and other components in communication with the data storage system. Element 514 may also represent the software component(s) that serve the agent software. For example, element 514 may also include the software component, such as an Apache web server, used to download the agent software.

Using the techniques herein, extensions to the agent or discovery data collection process may be performed by updating software included on the data storage system. If additional data elements are extracted from the monitored network traffic or an additional protocol is supported, the discovery rules and/or passive discovery processing code may be accordingly updated. If, for example, additional data is obtained from an API existing on an operating system, active discovery processing code of 508 may be updated. The discovery agent software may also be updated to obtain additional data. In such an instance, updates to the agent software may be propagated to the components from the data storage system using manual and/or automated update techniques known in the art.

Described herein are techniques that may be used to perform automated discovery processing. Such processing may be automatically performed as part of data storage system initialization to identify the topology and environment of the data storage system. The techniques herein may be used to perform data collection used in connection with determining best practices and customization of data storage system configuration for provisioning and other data services for the application. As described herein, the data storage system may serve as the initiator of this automated discovery process possessing knowledge and performing tasks beyond those typically performed by a data storage system. The data storage system automatically obtains information about its environment. The data storage system understands protocols of the components, such as the servers, and the applications to learn about the servers and applications. The software used in connection with the automated discovery processing is included in the data storage system which initially monitors network traffic to obtain a first set of discovery information.

Based on the first set of information, the data storage system may utilize other techniques in connection with active mode discovery processing. For example, passive mode data collection may determine that application X is executing on server Y. Using this information, further inquiries regarding application X and/or server Y may be made as part of active mode processing using a discovery agent and/or leveraging existing software on a component. In the event there are updates to the discovery processing, for example, to gather information about a new software application or new feature of an existing application, the software of the data storage system, including any discovery rules, may be updated to appropriately collect any new data. If an agent is updated, the agent updates can be automatically communicated to the servers or other components including agent software.

In one embodiment as described herein, for example, in FIG. 2, the data storage system using the techniques herein may be connected as a component in a computer network. The data storage system may understand protocols used in connection with processing data storage I/O requests, such as iSCSI and SCSI protocols for I/O requests issued over a variety of different types of connections such as Ethernet or Fibre Channel. Additionally, in accordance with the techniques herein, the data storage system may understand other protocols, such as HTTP, TCP/IP, and the like which may be used in connection with messages of the computer network. The data storage system may perform automated application discovery to discover information about the network and applications to which the data storage system is connected. The foregoing discovery information in connection with performing operations, such as data storage provisioning operations, customized for the different applications which host data on the data storage system.

It should be noted that the techniques herein may be used to perform discovery processing more than once, for example, due to the changing and evolving aspects in connection with applications and associated storage over time. For example, the applications having their data hosted on a data storage system may change over a period time. At a first point in time, one set of applications may host their data on the data storage system. At a second later point in time, one or more additional applications may host their data on the data storage system. Also at this second point in time, one or more applications from the set of applications may no longer host their data on the data storage system. As such, the techniques herein may be used to repeatedly perform application discovery processing at various points in time depending on the changes with respect to applications and associated storage hosted on a data storage system.

The techniques herein may be implemented using any one of a variety of different components and storage architectures. For example, the techniques herein may be implemented in an embodiment including an appliance and data storage devices. In one embodiment, the appliance may be separate from a data storage system including the data storage devices. In an alternate embodiment, the appliance and the data storage system may be integrated as a single component in which the techniques herein are performed.

As described herein, automated discovery of the applications and application environments may be performed and data relating thereto may be obtained. The data may then be used in connection with determining the appropriate data storage configuration and parameters for data storage services for each application.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for performing automated discovery processing in a network comprising:
   performing passive discovery processing including:
   monitoring, by a data storage system, transmissions sent over the network;
   identifying, by the data storage system in accordance with a plurality of different protocols, one or more data elements to be extracted from one or more messages included in the transmissions;
   extracting, by the data storage system, said one or more data elements from said one or more messages, said extracting including the data storage system extracting a first of said one or more data elements from a first message one or more data elements in accordance with at least a first protocol at an application layer, said first data element identifying an application which issued the first message; and
   determining, by the data storage system using said one or more data elements, first discovery information, said first discovery information including information identifying said application executing on a component in the network; and
   performing active discovery processing using said first discovery information, said active discovery processing including processing to obtain second discovery information regarding said application and said component identified by said first discovery information;
   wherein said automated discovery processing discovers storage configuration information about local storage of said component used by said application, and wherein the method further comprises:
   provisioning storage of the data storage system in accordance with said storage configuration information;
   selecting a data protection service in accordance with said storage configuration information, said selecting including determining an appropriate RAID protection level; and
   migrating data from said local storage to the storage provisioned in said provisioning.

2. The method of claim 1, wherein said passive discovery processing is performed as part of initializing said data storage system.

3. The method of claim 1, wherein said data storage system obtains at least some of said second discovery information by communicating with the component.

4. The method of claim 3, wherein said data storage system obtains a portion of said second discovery information using a discovery agent installed on the component.

5. The method of claim 4, wherein said data storage system obtains another portion of the second discovery information using software on the component without using said discovery agent.

6. The method of claim 1, wherein the data storage system is connected to a computer network to perform said automated discovery processing and the data storage system processes I/O requests in accordance with at least one of iSCSI or SCSI protocols.

7. A data storage system comprising code stored on a non-transitory computer readable medium for performing automated discovery processing in a computer network, the non-transitory computer readable storage medium comprising code stored thereon for:
performing passive discovery processing including:
monitoring, by a data storage system, transmissions sent over the network;
identifying, by the data storage system in accordance with a plurality of different protocols, one or more data elements to be extracted from one or more messages included in the transmissions;
extracting, by the data storage system, said one or more data elements from said one or more messages, said extracting including the data storage system extracting a first of said one or more data elements from a first message in accordance with at least a first protocol at an application layer, said first data element identifying an application which issued the first message; and
determining, by the data storage system using said one or more data elements, first discovery information, said first discovery information including information identifying said application executing on a component in the network; and
performing active discovery processing using said first discovery information, said active discovery processing including processing to obtain second discovery information regarding said application and said component identified by said first discovery information;
wherein said automated discovery processing discovers storage configuration information about local storage of said component used by said application, and wherein the method further comprises:
provisioning storage of the data storage system in accordance with said storage configuration information;
selecting a data protection service in accordance with said storage configuration information, said selecting including determining an appropriate RAID protection level; and
migrating data from said local storage to the storage provisioned in said provisioning.

8. The data storage system of claim 7, wherein said code for monitoring monitors network traffic for the computer network using a spanning port.

9. The data storage system of claim 7, wherein the computer readable storage medium comprises code stored thereon for:
processing data storage requests.

10. A data storage system comprising code stored on a non-transitory computer readable medium for performing automated discovery processing in a computer network, the non-transitory computer readable storage medium comprising code stored thereon for:
performing passive discovery processing including:
monitoring, by a data storage system, transmissions sent over the network;
identifying, by the data storage system in accordance with a plurality of different protocols, one or more data elements to be extracted from one or more messages included in the transmissions;
extracting, by the data storage system, said one or more data elements from said one or more messages, said extracting including the data storage system extracting a first of said one or more data elements from a first message in accordance with at least a first protocol at an application layer, said first data element identifying an application which issued the first message; and
determining, by the data storage system using said one or more data elements, first discovery information, said first discovery information including information identifying said application executing on a component in the network; and
performing active discovery processing using said first discovery>information, said active discovery processing including processing to obtain second discovery information regarding said application and said component identified by said first discovery information;
wherein said automated discovery processing discovers storage configuration information about local storage of said component used by said application, and wherein the non-transitory computer readable medium further comprises code stored thereon for;
provisioning storage of the data storage system in accordance with said storage configuration information;
selecting a data protection service in accordance with said storage configuration information, said selecting including determining an appropriate RAID protection level; and
migrating data from said'local storage to the storage provisioned in said, provisioning.

11. The method of claim 1, wherein said extracting includes the data storage system extracting, from at least one of the transmissions obtained by said monitoring, at least one data element in accordance with an application layer protocol used by an electronic mail application.

12. The data storage system of claim 10, wherein the non-transitory computer readable storage medium comprises code stored thereon for:
processing data storage requests.

13. The method of claim 1, wherein said first data element is extracted from a first message header of a request, and wherein said extracting includes:
extracting, from a second message header in accordance with an internet layer protocol, a data element identifying an address; and
extracting, from a third message header in accordance with a transport layer protocol, a data element identifying a port.

* * * * *